US010332347B2

(12) United States Patent
Ali et al.

(10) Patent No.: US 10,332,347 B2
(45) Date of Patent: Jun. 25, 2019

(54) WEARABLE DEVICES FOR USE IN AN ENTERTAINMENT ENVIRONMENT

(71) Applicant: INTERNATIONAL BUSINESS MACHINES CORPORATION, Armonk, NY (US)

(72) Inventors: Asmahan A. Ali, Highland, NY (US); Ali Y. Duale, Poughkeepsie, NY (US); Mustafa Y. Mah, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 375 days.

(21) Appl. No.: 15/218,108

(22) Filed: Jul. 25, 2016

(65) Prior Publication Data

US 2018/0025582 A1 Jan. 25, 2018

(51) Int. Cl.

*G06F 17/00* (2019.01)
*G07F 17/32* (2006.01)

(52) U.S. Cl.

CPC ...... *G07F 17/3251* (2013.01); *G07F 17/3206* (2013.01); *G07F 17/3209* (2013.01); *G07F 17/3211* (2013.01); *G07F 17/3225* (2013.01); *G07F 17/3248* (2013.01); *G07F 17/3255* (2013.01); *G07F 17/3297* (2013.01)

(58) Field of Classification Search

None
See application file for complete search history.

(56) References Cited

U.S. PATENT DOCUMENTS 8,777,735 B1 * 7/2014 Fine .................... G07F 17/3288 463/25
9,138,650 B2 9/2015 Barney et al.
2006/0223518 A1 * 10/2006 Haney ..................... H04W 4/21 455/420
2007/0167226 A1 * 7/2007 Kelly ...................... G07F 17/32 463/29
2008/0072064 A1 * 3/2008 Franchi .................. G06F 21/32 713/186

(Continued)

OTHER PUBLICATIONS

Anonymous, Internet Article Entitled: "Unlock the Magic with Your MagicBand or Card", MagicBands & Admission Cards . . . http://disneyworld.disney.go.com/plan/my-disney-experience/bands-cards/; 3 pgs.

(Continued)

*Primary Examiner* — Paul A D'Agostino
(74) *Attorney, Agent, or Firm* — Cantor Colburn LLP; Teddi Maranzano

(57) ABSTRACT

Methods, systems and computer program products for utilizing wearable devices in an entertainment environment are provided. Aspects include creating associations between a plurality of individuals and a plurality of wearable devices and classifying each of the plurality of individuals into one or more groups, wherein each group includes at least one child and at least one parent. Aspects also include tracking a location of one of the plurality of wearable devices associated with a first child of a first group and based on a determination that the first child is attempting to leave a predetermined area, determining whether the first child is accompanied by a first adult, wherein the first adult is a member of the first group.

17 Claims, 5 Drawing Sheets

(56) References Cited

U.S. PATENT DOCUMENTS

| | | | | |
|---|---|---|---|---|
| 2009/0115133 | A1* | 5/2009 | Kelly | G07F 17/32 273/274 |
| 2010/0144368 | A1* | 6/2010 | Sullivan | H04W 4/02 455/456.2 |
| 2010/0203932 | A1 | 8/2010 | Briggs et al. | |
| 2011/0078196 | A1* | 3/2011 | Jorgensen | G06F 21/6218 707/783 |
| 2011/0117982 | A1* | 5/2011 | Nguyen | G07F 17/32 463/16 |
| 2012/0214599 | A1* | 8/2012 | Joung | G07F 17/3272 463/42 |
| 2012/0223834 | A1 | 9/2012 | Hyatt | |
| 2013/0254137 | A1 | 9/2013 | Hunt | |

OTHER PUBLICATIONS

Dockterman, Elaina "Now Disney Can Track Your Every Move with NSA-Style Wristbands", Jan. 2, 2014; http://entertainmenttime.com/2014/01/02/disney-nsa-style-magic-bands-t . . . , 2 pgs.

* cited by examiner

WEARABLE DEVICES FOR USE IN AN ENTERTAINMENT ENVIRONMENT

BACKGROUND

The present invention generally relates to improving a user experience in an entertainment environment, and more particularly to utilizing wearable devices by individuals in an entertainment environment.

Traditionally, when adults take children to entertainment environments such as arcades, playgrounds, etc. an attendant stamps the hands of each member of the group with a unique stamp that identifies what adult is responsible for what children. These stamps are prone to several possible issues including fading, being wiped off, and forgery.

In addition, in many entertainment environments there are games that require cash or tokens to play, such as video games, air hockey, skeeball and the like. Many of these games provide reward tickets that can be redeemed for prizes. Currently, after playing games and winning reward tickets, a user takes the reward tickets to a machine that counts the reward tickets and provides a receipt that includes the total number of reward tickets. This receipt is then given to an attendant that provides one or more prizes to the individual. The current system requires repeated stocking of reward tickets in the games, repeated removal of the tokens or cash from the games and the use of a special machine to count the tickets and provide a receipt.

Therefore, heretofore unaddressed needs still exist in the art to address the aforementioned deficiencies and inadequacies.

SUMMARY

In accordance with an embodiment, a method for utilizing wearable devices in an entertainment environment is provided. The method includes creating associations between a plurality of individuals and a plurality of wearable devices and classifying each of the plurality of individuals into one or more groups, wherein each group includes at least one child and at least one parent. The method also includes tracking a location of one of the plurality of wearable devices associated with a first child of a first group and based on a determination that the first child is attempting to leave a predetermined area, determining whether the first child is accompanied by a first adult, wherein the first adult is a member of the first group.

In another embodiment of the invention, a processing system for utilizing wearable devices in an entertainment environment includes a processor configured to create associations between a plurality of individuals and a plurality of wearable devices and classify each of the plurality of individuals into one or more groups, wherein each group includes at least one child and at least one parent. The processor is also configured to track a location of one of the plurality of wearable devices associated with a first child of a first group and based on a determination that the first child is attempting to leave a predetermined area, determine whether the first child is accompanied by a first adult, wherein the first adult is a member of the first group.

In accordance with a further embodiment, a computer program product for utilizing wearable devices in an entertainment environment includes a non-transitory storage medium readable by a processing circuit and storing instructions for execution by the processing circuit for performing a method. The method includes creating associations between a plurality of individuals and a plurality of wearable devices and classifying each of the plurality of individuals into one or more groups, wherein each group includes at least one child and at least one parent. The method also includes tracking a location of one of the plurality of wearable devices associated with a first child of a first group and based on a determination that the first child is attempting to leave a predetermined area, determining whether the first child is accompanied by a first adult, wherein the first adult is a member of the first group.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments include methods, systems, and computer program products for utilizing one or more wearable devices in an entertainment environment. In exemplary embodiments, an entertainment environment is a facility that includes games and attractions for children and adults. In exemplary embodiments, each individual in the entertainment environment is associated with a wearable device that is used to track the location of the individual in the entertainment environment. The wearable devices are also used to grant access to play games and to receive reward tickets for a performance in playing the games. In exemplary embodiments, a processing system is configured to track the location of the wearable devices and to provide alerts to adults when a child either leaves a predetermined area or is more than a predetermined distance from the adult.

Figure 1:
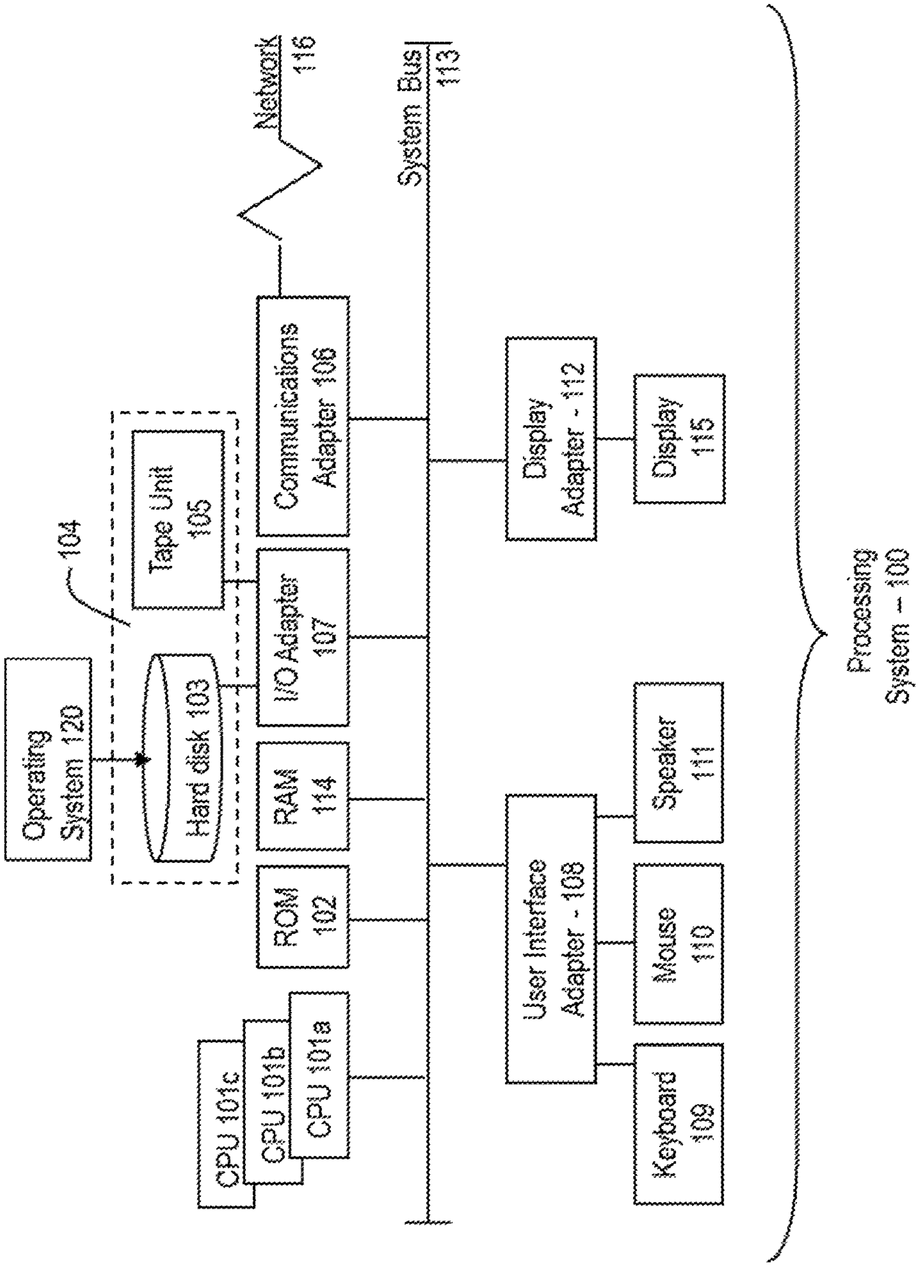
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101*a*, 101*b*, 101*c*, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the processing system 100 includes processing capability in the form of processors 101, storage capability including the system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
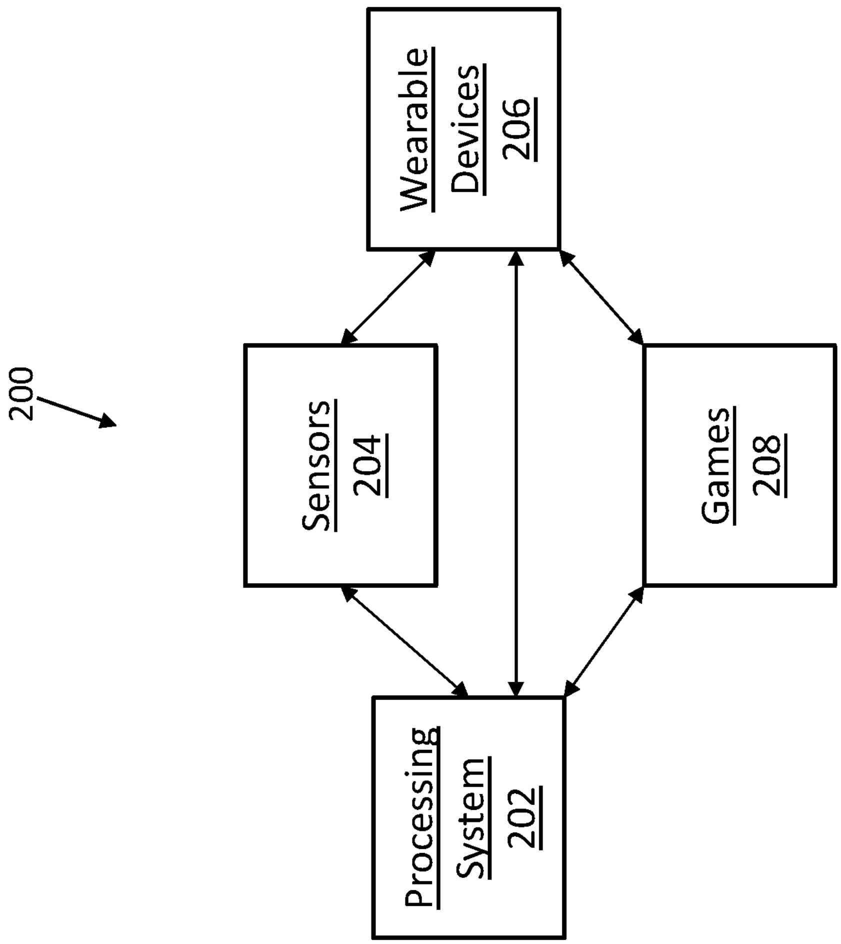
FIG. 2 is a block diagram illustrating a system for utilizing one or more wearable devices in an entertainment environment in accordance with exemplary embodiment.

Referring now to FIG. 2, a system 200 utilizing one or more wearable devices in an entertainment environment is shown. As illustrated, the system 200 includes a processing system 202, such as the one shown in FIG. 1, a plurality of sensors 204, a plurality of wearable devices 206 and a plurality of game 208. In exemplary embodiments, the plurality of wearable devices 206 are configured to communicate with each of the processing system 202, the sensors 204 and the games 208.

In exemplary embodiments, the wearable device 206 communicates with a game to request permission play the games 208. The request is granted based on a determination that a number of tokens associated with the wearable device 206 are at least a number of tokens required to play the game. In addition, the determination to grant the request may be based on a comparison of a user profile associated with the wearable device 206 to a rating of the game 208. For example, the user profile may indicate an age of an individual associated with the wearable device 206 and the rating of the game may indicate a minimum age for playing the game.

In exemplary embodiments, the sensors 204 may include near field communication (NFC) sensors, radio frequency identification (RFID) sensors, Bluetooth™ sensors or the like. The sensors 204 are disposed at known locations in the entertainment environment and are used to determine the location of the wearable devices 206 in the entertainment environment. For example, a triangulation method may be used to calculate the location of a wearable device 206 based on the signals it receives from the one or more sensors 204. In exemplary embodiments, the sensors 204 may be standalone devices or the sensors 204 may be disposed in the games 208.

In exemplary embodiments, access to and from the entertainment environment is controlled to prevent a child from leaving the entertainment environment without their parent or guardian. For example, at every point of entry or exit to the entertainment environment, a sensor 204 may be disposed to communicate with the wearable device of a child and an adult attempting to leave and to verify that the adult is the parent or guardian of the child. In one example, a parent attempting leave may place their wearable device 206 next to a sensor 204 and the wearable devices 206 of children associated with the parent may display an authorization icon or emit a predetermined sound.

Figure 3:
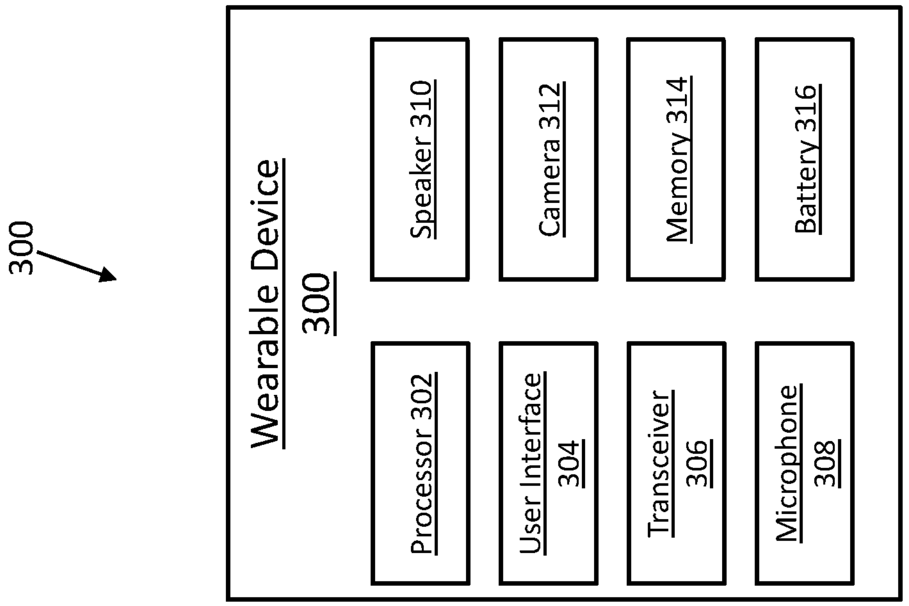
FIG. 3 is a block diagram illustrating a wearable device in accordance with exemplary embodiment.

Referring now to FIG. 3, a wearable device 300 in an entertainment environment is shown. As illustrated, the wearable device 300 includes a processor 302, a user interface 304, a transceiver 306, a microphone 308, a speaker 310, a camera 312, a memory 314 and a battery 316. In exemplary embodiments, the user interface 304 may be a touch screen display that is configured to display relevant information to the user, such as the number of tokens or reward tickets that the user has. In one embodiment, the wearable devices 300 can be configured to facilitate communication between members of a group. For example, the wearable devices 300 can be configured to support point to point voice calls, instant messaging and/or video chats between members of a group. In another embodiment, the wearable device 300 can be configured to display a map of the entertainment environment with the location of the other members of an individual's group indicated on the map. In one embodiment, the wearable devices 300 can be configured to communicate with a processing system in the entertainment environment to order food or to summon an attendant.

In exemplary embodiments, the wearable device 300 may be a specialty device that is given to each individual upon arrival at the entertainment environment and turned in when the individuals leave the entertainment environment. In another embodiment, the wearable device 300 may be a wearable device owned by an individual that includes an application designed to operate in the entertainment environment.

Figure 4:
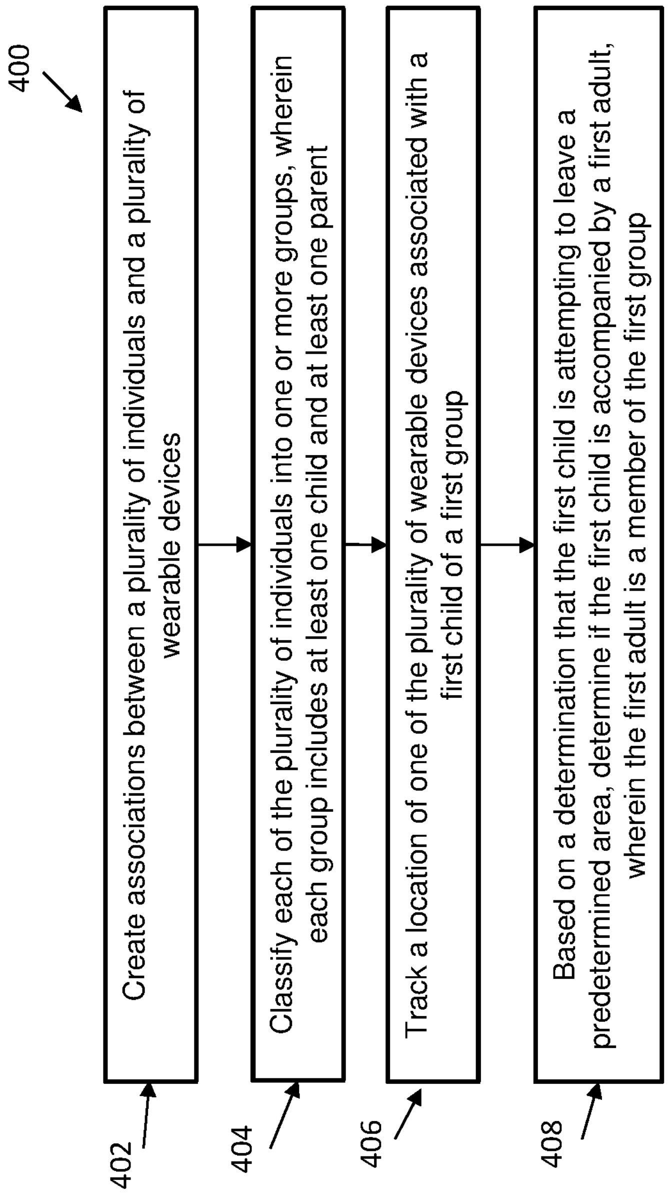
FIG. 4 shows a flow chart illustrating a method for utilizing one or more wearable devices in an entertainment environment in accordance with exemplary embodiment.

Referring now to FIG. 4, a method 400 for utilizing one or more wearable devices in an entertainment environment is shown. As shown at block 402, the method 400 includes creating associations between a plurality of individuals and a plurality of wearable devices. Next, as shown at block 404, the method 400 includes classifying each of the plurality of individuals into one or more groups, wherein each group includes at least one child and at least one parent. The method 400 also includes tracking a location of one of the plurality of wearable devices associated with a first child of a first group, as shown at block 406. Next, as shown at block 408, the method 400 includes determining if the first child is accompanied by a first adult based on a determination that the first child is attempting to leave a predetermined area.

In another embodiment, the method 400 may include alerting the first adult via the wearable device associated with the first adult based on a determination that the first child is more than a predetermined distance from the first adult. For example, an adult may set a predetermined distance to be ten feet and upon a determination that the child is more than ten feet from the adult, the adult may be alerted via the wearable device. In exemplary embodiments, the alert may include an audible alert and/or displaying the child's location on the display of the wearable device.

Figure 5:
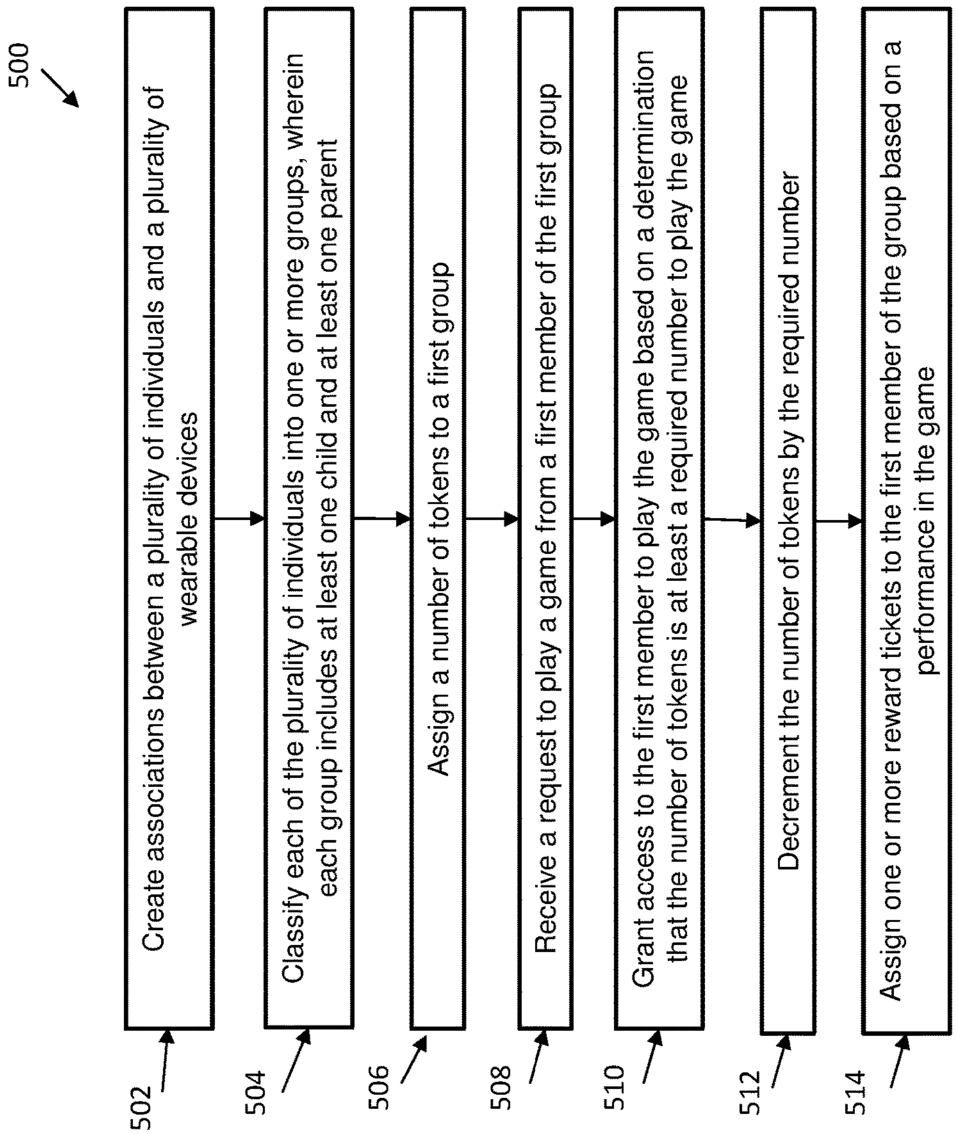
FIG. 5 shows a flow chart illustrating another method for utilizing one or more wearable devices in an entertainment environment in accordance with exemplary embodiment.

Referring now to FIG. 5, another method 500 for utilizing one or more wearable devices in an entertainment environment is shown. As shown at block 502, the method 500 includes creating associations between a plurality of individuals and a plurality of wearable devices. Next, as shown at block 504, the method 500 includes classifying each of the plurality of individuals into one or more groups, wherein each group includes at least one child and at least one parent. The method 500 also includes assigning a number of tokens to a first group, as shown at block 506. For example, a parent may purchase a number of tokens that can be shared among the members of the group. In one embodiment, the parent may be able to selectively assign the tokens to the members of the group.

Next, as shown at block 508, the method 500 includes receiving a request to play a game from a first member of the first group. The method 500 also includes granting access to the first member to play the game based on a determination that the number of tokens is at least a required number to play the game, as shown at block 510. In exemplary embodiments, granting access to the first member to play the game is further based on a user profile of the first member and a rating of the game. The user profile includes an age of the first member and the game rating includes an age range for the game. Next, as shown at block 512, the method 500 includes decrementing the number of tokens by the required number.

The method 500 also includes assigning one or more reward tickets to the first member of the group based on a performance in the game, as shown at block 514. In exemplary embodiments, the reward tickets are electronically assigned to the wearable device that was used to provide the tokens to play the game. In one embodiment, the members of a group are able to transfer both tokens and reward tickets among the wearable devices in the group. For example, a parent may buy one hundred tokens and transfer twenty tokens to each of three children and upon a child running out of the tokens the parent can transfer more to the child. In exemplary embodiments, the reward tickets can be redeemed for a prize by scanning a wearable device at a sensor by an attendant. The attendant will be provided the number of available reward tickets and can reduce the number of reward tickets based on the prize selected by the user.

In exemplary embodiments, the use of wearable devices in an entertainment environment allows the operator of the entertainment environment to obtain detailed information about the behavior of the patrons. For example, the operator can tell how many times each child plays a given game, the age ranges of children that play each game, the sequence in which the games are played and the like. In exemplary embodiments, the operator of the entertainment environment can use this information to optimize the layout of the entertainment environment and in determining what new games to buy and what games are underutilized.

In exemplary embodiments, the use of wearable devices in an entertainment environment allows the operator of the entertainment environment to realize savings in labor costs by eliminating the need for employees to continually stock games with reward tickets and to remove cash and tokens from the games. In addition, the entertainment environment no longer will require a special use machine for counting reward tickets and printing receipts.

In exemplary embodiments, the use of wearable devices in an entertainment environment improves the customer experience and enjoyment of the entertainment environment. The use of the wearable device by the patrons eliminates the need for the patrons to manage the use of physical tokens and reward tickets and reduces their concern of these items being misplaced or lost. In addition, the reward ticket redemption process is streamlined by the use of the wearable devices because the patrons no longer have to use an additional machine to count the reward tickets prior to redemption.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for utilizing one or more wearable devices in an entertainment environment, the method comprising:

creating associations between a plurality of individuals and a plurality of wearable devices;

classifying each of the plurality of individuals into one or more groups, wherein each group includes at least one child and at least one parent;

tracking a location of one of the plurality of wearable devices associated with a first child of a first group;

assigning a number of tokens to a first group;

receiving a request to play a game from a first member of the first group;

granting access to the first member to play the game based on a determination that the number of tokens is at least a required number to play the game; and based on a determination that the first child is attempting to leave a predetermined area, determining whether the first child is accompanied by a first adult, wherein the first adult is a member of the first group.

2. The method of claim 1, further comprising based on a determination that the first child is more than a predetermined distance from the first adult, alerting the first adult via the wearable device associated with the first adult.

3. The method of claim 1, further comprising:

decrementing the number of tokens by the required number; and assigning one or more reward tickets to the first member of the group based on a performance in the game.

4. The method of claim 1, wherein granting access to the first member to play the game is further based on a user profile of the first member and a rating of the game.

5. The method of claim 4, wherein the user profile includes an age of the first member and the game rating includes an age range for the game.

6. The method of claim 1, further comprising storing usage statistics for the game including a number of times an individual plays the game.

7. The method of claim 1, wherein tracking the location of the one of the plurality of wearable devices is performed using a plurality of sensors disposed at known locations in the entertainment environment.

8. The method of claim 7, wherein at least one of the plurality of sensors is disposed with a game in the entertainment environment.

9. A computer program product for utilizing one or more wearable devices in an entertainment environment, the computer program product comprising:

a non-transitory storage medium readable by a processing circuit and storing instructions for execution by the processing circuit for performing a method comprising:

creating associations between a plurality of individuals and a plurality of wearable devices;

classifying each of the plurality of individuals into one or more groups, wherein each group includes at least one child and at least one parent;

tracking a location of one of the plurality of wearable devices associated with a first child of a first group;

assigning a number of tokens to a first group;

receiving a request to play a game from a first member of the first group;

granting access to the first member to play the game based on a determination that the number of tokens is at least a required number to play the game; and based on a determination that the first child is attempting to leave a predetermined area, determining whether the first child is accompanied by a first adult, wherein the first adult is a member of the first group.

10. The computer program product of claim 9, wherein the method further comprises based on a determination that the first child is more than a predetermined distance from the first adult, alerting the first adult via the wearable device associated with the first adult.

11. The computer program product of claim 9, wherein the method further comprises:

decrementing the number of tokens by the required number; and assigning one or more reward tickets to the first member of the group based on a performance in the game.

12. The computer program product of claim 9, wherein granting access to the first member to play the game is further based on a user profile of the first member and a rating of the game.

13. The computer program product of claim 12, wherein the user profile includes an age of the first member and the game rating includes an age range for the game.

14. The computer program product of claim 9, wherein the method further comprises storing usage statistics for the game including a number of times an individual plays the game.

15. A processing system for utilizing one or more wearable devices in an entertainment environment including a processing system configured to:

create associations between a plurality of individuals and a plurality of wearable devices;

classify each of the plurality of individuals into one or more groups, wherein each group includes at least one child and at least one parent;

track a location of one of the plurality of wearable devices associated with a first child of a first group;

assign a number of tokens to a first group;

receive a request to play a game from a first member of the first group;

grant access to the first member to play the game based on a determination that the number of tokens is at least a required number to play the game; and determine whether the first child is accompanied by a first adult, wherein the first adult is a member of the first group based on a determination that the first child is attempting to leave a predetermined area.

16. The processing system of claim 15, wherein the processing system is further configured to alert the first adult via the wearable device associated with the first adult based on a determination that the first child is more than a predetermined distance from the first adult.

17. The processing system of claim 15, wherein the processing system is further configured to:

decrement the number of tokens by the required number; and assign one or more reward tickets to the first member of the group based on a performance in the game.

* * * * *